United States Patent [19]

Hanai et al.

[11] Patent Number: 4,587,170

[45] Date of Patent: May 6, 1986

[54] MAGNETIC RECORDING MEDIUM

[75] Inventors: Kazuko Hanai; Takashi Yoneyama; Toshihisa Ito, all of Kanagawa, Japan

[73] Assignee: Fuji Photo Film Co., Ltd., Kanagawa, Japan

[21] Appl. No.: 625,770

[22] Filed: Jun. 28, 1984

[30] Foreign Application Priority Data

Jun. 30, 1983 [JP] Japan ................. 58-118496

[51] Int. Cl.$^4$ .............................................. G11B 5/70
[52] U.S. Cl. ........................... 428/425.9; 252/62.54;
    360/134; 360/135; 360/136; 427/128; 428/328;
    428/329; 428/694; 428/900; 428/522; 428/532
[58] Field of Search ............... 428/425.9, 694, 695,
    428/900, 522, 532, 328, 329; 427/44, 54.1, 128;
    252/62.54; 360/134–136

[56] References Cited

U.S. PATENT DOCUMENTS

| | | | |
|---|---|---|---|
| 3,419,420 | 12/1968 | Stahly | 427/128 |
| 3,499,789 | 3/1970 | Delmore | 428/425.9 |
| 3,597,273 | 8/1971 | Akashi | 428/425.9 |
| 3,650,828 | 3/1972 | Higashi | 428/425.9 |
| 3,713,887 | 1/1973 | Stimson | 428/481 |
| 3,781,210 | 12/1973 | Lohoff | 523/400 |
| 3,781,211 | 12/1973 | Lohoff | 523/400 |
| 4,135,016 | 1/1979 | Ogawa | 428/900 |
| 4,368,237 | 6/1983 | Yamada | 428/900 |
| 4,499,121 | 2/1985 | Yamaguchi | 427/128 |

*Primary Examiner*—Ellis P. Robinson
*Attorney, Agent, or Firm*—Sughrue, Mion, Zinn, Macpeak and Seas

[57] ABSTRACT

A magnetic recording medium comprising a nonmagnetic support having coated thereon a magnetic recording layer comprising a ferromagnetic particles dispersed in a binder, the binder containing polyisocyanate and the molar ratio of (urethane bond+allophanate bond):(urea bond+biuret bond) being 85:15 to 60:40.

8 Claims, No Drawings

MAGNETIC RECORDING MEDIUM

FIELD OF THE INVENTION

The present invention relates to a magnetic recording medium such as a video tape, an audio tape or a computer tape.

BACKGROUND OF THE INVENTION

A coating composition comprising a thermoplastic resin such as a vinyl chloride-vinyl acetate copolymer, a vinyl chloride-vinylidene chloride copolymer, a cellulose resin, an acetal resin, a urethane resin or an acrylonitrile-butadiene copolymer alone or in combination as a binder and a ferromagnetic powder coated on a support such as a polyethylene terephthalate, cellulose triacetate or a polyvinyl chloride has been used for a magnetic recording medium. However, the wear resistance of the magnetic recording layer of the magnetic recording medium is worse and tape guiding systems for running the magnetic tapes are readily contaminated, as the more the medium is used.

In order to prepare a magnetic recording layer having excellent wear resistance, a thermosetting resin (such as a melamine resin or a urea resin) or a mixture of the thermosetting resin and a cross-linkable binder which is cross-linked by chemical reaction, such as an isocyanate compound or an epoxy compound is used as a binder as described in, for example, U.S. Pat. Nos. 3,419,420, 3,499,789, 3,597,273, 3,713,887, 3,781,210 and 3,781,211..

A urea formation reaction by which urea is formed from an isocyanate group and water, a biuret formation reaction in which urea, formed by the urea formation reaction, is reacted with an isocyanate group, a urethane formation reaction in which an isocyanate group is reacted with a hydroxy group in another binder, an allophanate formation reaction in which a urethane bond is reacted with an isocyanate group, an amide formation reaction in which a carboxylic group in another binder is reacted with an isocyanate group, and an acylurea formation reaction in which an amide is reacted with an isocyanate group are known as reactions of polyisocyanate in a magnetic recording layer. The curing reaction proceeds in a magnetic recording layer in accordance with the above-described reactions.

SUMMARY OF THE INVENTION

An object of the present invention is to provide a magnetic recording medium having excellent wear resistance.

As the result of thorough investigations as to a system using as a main binder a vinyl chloride type copolymer and/or nitrocelllose with a polyurethane and a polyisocyanate in combination, it has now been found that where a curing reaction of polyisocyanate in a magnetic recording layer is accelerated by providing the magnetic recording layer with at least one of temperature, humidity and catalyst, the physical properties of the magnetic recording layer can be changed by the ratio of the thus formed (urethane bond+allophanate bond) and the thus formed (urea bond+biuret bond).

DETAILED DESCRIPTION OF THE INVENTION

The ratio of (urethane bond+allophanate bond) and (urea bond+biuret bond) was measured by measuring $^1$H-NMR (proton nuclear magnetic resonance spectroscopy) as described in Sumi et al: *Makromolekulare Chem.*, 78, 146 (1964) after dissolving the magnetic recording layer in an amine as described in Furukawa et al: *Reports of the Faculty of Engineering, Nagasaki University*, 8, 67 (1977) and removing the ferromagnetic particles therefrom.

Whether or not a curing reaction has proceeded was measured by measuring the residual amount of isocyanate group at 2,275 cm$^{-1}$ by FT-IR (Fourier Transform Infrared Spectrometer). That is, ratios of the absorbance at 1730 cm$^{-1}$ by an ester group (when a polyurethane having a polyester skeleton is used) in a magnetic recording medium to the absorbance at 2,275 cm$^{-1}$ by an isocyanate group in the magnetic recording medium are obtained using FT-IR at various points in time and the values obtained are compared with the value immediately after coating being assumed to be 100.

The ratio of (urethane bond+allophanate bond) and (urea bond+biuret bond) can be adjusted by temperature, humidity and the kinds and concentration of catalysts to be used.

The following method can be used to prepare a magnetic recording medium having excellent wear resistance for short periods by accelerating the reaction of the polyisocyanate in the magnetic recording layer to cure the magnetic recording layer.

(1) The ratio of formation of (urea bond+biuret bond) can be increased by incorporating water into a magnetic recording layer to accelerate the reaction of polyisocyanate with water.

The ratio of formation of (urea bond+biuret bond) can be adjusted by the amount of water present. Heat treatment can be carried out after providing the water.

The amount of water present in a magnetic recording medium at the time when polyisocyanate and water react with each other is 0.2% by weight, preferably 0.35% by weight and more preferably 0.42% by weight.

(2) The magnetic recording medium is heat treted at a relatively low temperature (30° C. to 70° C.) for 5 to 50 hours.

By treating the magnetic recording medium in a roll form without addition of water to the magnetic recording layer, the ratio of forming (urethane bond+allophanate bond) which is formed by the reaction of an alcohol of polymer, urethane bond and isocyanate can be increased.

(3) A suitable catalyst can be incorporated in the magnetic recording layer. Alternatively, the ratio of (urethane bond+allophanate bond) and (urea bond+biuret bond) can be adjusted by overcoating, spraying or soaking the magnetic recording layer with the catalyst. Suitable examples of the catalyst include tertiary amines, tin compounds and other organic metal compounds, amphoteric ion compounds, etc. as described in U.S. patent application Ser. No. 592,981 filed Mar. 23, 1984. The catalyst can be used 0.1 to 40% by weight, preferably 1 to 20% by weight based on the weight of the polyisocyanate.

The wear resistance of the magnetic recording layer can be increased by adjusting the molar ratio of (urethane bond+allophanate bond) and (urea bond+biuret bond) as 85:15 to 60:40 preferably 80:20 to 70:30.

The most important feature of the magnetic recording medium in this invention is that a vinyl chloride copolymer and/or nitrocellulose is a main binder component for dispersing a ferromagnetic powder together with a polyurethane and a polyisocyanate. Usually, the amounts of a main binder component, a polyurethane and a polyisocyanate are 15 to 60% by weight, 20 to 60% by weight and 5 to 90% by weight, respectively, based on the weight of the total binder, and preferably 20 to 60% by weight, 20 to 60% by weight and 10 to 60% by weight, respectively, based on the weight of the total binder. Each material to be used, a method for preparing a coating composition, a coating method, a calendering method and a slitting method are those conventionally known, as disclosed in Japanese Patent Publication Nos. 22073/72 and 9841/78, Japanese Patent Application (OPI) Nos. 43405/77, 142756/77, 133521/82, 135439/82 and 98719/81 (the term "OPI" as used herein refers to a "published unexamined Japanese patent application") and U.S. Pat. No. 4,135,016.

Ferromagnetic powders used in the present invention include ferromagnetic iron oxide fine powders, Codoped ferromagnetic iron oxide fine powders, ferromagnetic chromium dioxide fine powders, ferromagnetic alloy fine powders and barium ferrite. The acicular ratio of ferromagnetic iron oxide and chromium dioxide is about 2/1 to about 20/1, preferably more than 5/1. An average length of the ferromagnetic alloy powders is about 0.2 to about 2.0 $\mu$m. The ferromagnetic alloy fine powders generally have a metal content more than 75 wt%, with more than 80 wt% of the metal content being a ferromagnetic metal (i.e., Fe, Co, Ni, Fe—Co, Fe—Ni, Co—Ni, Fe—Co—Ni), and has a longer diameter of less than about 1.0 $\mu$m.

Examples of organic solvents which can be used for the magnetic coating composition include ketones such as acetone, methyl ethyl ketone, methyl isobutyl ketone, cyclohexanone; esters such as methyl acetate, ethyl acetate, butyl acetate, ethyl lactate, and monoethyl ether glycol acetate; glycol ethers such as diethyl ether, glycol dimethyl ether, glycol monomethyl ether and dioxane; aromatic hydrocarbons such as benzene, toluene and xylene; chlorinated hydrocarbons such as methylene chloride, ethylene chloride, carbon tetrachloride, chloroform, ethylene chlorohydrin and dichlorobenzene. The organic solvent can be used in an amount of about 400 to about 1,500 parts by weight, preferably 600 to 1,200 parts by weight, per 100 parts by weight of the resin composition.

Additives such as a lubricant, an abrasive, a dispersing agent, a rust preventing agent or an antistatic agent can be added to the magnetic coating composition of the present invention. Examples of lubricants are saturated or unsaturated higher fatty acids, fatty acid esters, higher fatty acid amides, higher alcohols, each containing 10 or more carbon atoms, preferably 12 or more carbon atoms, silicone oils, mineral oils, edible oils or fluoride type compounds. Examples of rust preventing agents are salicylanilide, tin oxide, mercury phenyloleate, copper naphthenate, zinc naphthenate, trichlorophenol, p-dinitrophenol, sorbic acid, butyl p-oxybenzoate, dihydroacetoacetic acid and the like. Some of these additives are disclosed in U.S. Pat. No. 4,135,016. These additives can be added when a coating composition is prepared, or can be coated or sprayed on a surface of a magnetic layer with or without an organic solvent after drying, smoothing the magnetic layer or curing the magnetic layer by electron beam radiation.

Materials for the support on which the magnetic coating composition is coated include polyesters such as polyethylene terephthalate or polyethylene-2,6-naphthalate; polyolefines such as polyethylene or polypropylene; cellulose derivatives such as cellulose triacetate; plastics such as polycarbonate, polyimide or polyamide; non-magnetic metals such as aluminum, copper, tin, zinc or non-magnetic alloys including the above metals; and a kind of paper or a paper coated or laminated with polyolefines. Preferred examples of the supports include polyethylene terephthalate, polyethylene-2,6-naphthalate and polyimide films. The thickness of these supports can be generally in the range of about 5 to about 100 $\mu$m, preferably 7 to 20 $\mu$m, but can vary widely over the above range depending upon the utility of magnetic recording media.

The thickness of a magnetic recording layer can be 1 to 6 $\mu$m.

The invention will be further explained in greater detail by the following Example, but the invention should not be construed as being limited thereto. In the Example, "part" means "part by weight".

EXAMPLE

A coating composition having the following composition was prepared to obtain a recording tape having a wide width.

|  | Parts |
|---|---|
| Co-coated $\gamma$-Fe$_2$O$_3$ (Hc 630 Oe, average particle size 0.33 $\mu$m) | 300 |
| Vinyl Chloride-Vinyl Acetate-Maleic Acid Copolymer (polymerization degree 430, weight ratio 82:13:5) | 35 |
| Polyurethane Resin (synthesized from butylene adipate and tolylene diisocyante, molecular weight 47,000) | 26 |
| Carbon Black (electroconductive carbon black, average particle size 30 $\mu$m) | 20 |
| Cr$_2$O$_3$ (average particle size 0.2 $\mu$m) | 5 |
| Myristic Acid | 7 |
| Butyl Stearate | 1 |
| Methyl Ethyl Ketone/Butyl Acetate (weight ratio 3:7) | 780 |

The above composition was mixed and dispersed using a ball mill and a sand mill to prepare a magnetic coating composition. Finally, 16 parts (solid content) of reaction product of 1 mole of trimethylolpropane and 3 moles of tolylene diisocyanate ("Coronate L" manufactured by Nippon Polyurethane Co., Ltd.) as a low molecular polyisocyanate were added to prepare a magnetic coating composition.

The thus prepared coating composition was coated in a dry thickness of 5 $\mu$m on a polyetylene terephthalate support having a thickness of 15 $\mu$m and having a subbing layer composed of a polyester type polymer. The magnetic coating layer was dried and subjected to a supercalendering at a speed of 100 m/min.

The recording tape in a roll form was stored at 70° C. (Sample No. 1) and at 40° C. (Sample No. 2) so that the curing reaction could sufficiently proceed.

After calendering and immediately before winding, the tape was exposed to an atmosphere at 40° C. and 80% RH for 1.5 seconds to adjust the moisture content. The moisture content of the magnetic recording tape which was measured by a weight method was 0.42 wt%. After adjusting the moisture content, the tape was stored at 70° C. (Sample No. 3) and at 40° C. (Sampel No. 4).

Sample Nos. 1 to 4 were removed 12, 24 and 48 hours, respectively, later, and the characteritic of each of the samples were evaluated.

The characteristics of each sample is shown in Table 1 below.

TABLE 1

| Sample No. | Humidity Adjustment (40° C., 80% RH, 1.5 sec.) | Storage Temperature (°C.) | Storage Period (hr) | Residual NCO (100: immediately after coating) | (Urethane Bond + Allophanate Bond): (Urea Bond + Biuret Bond) (mol/mol) | Chroma S/N (dB) | Still Life | Particle Drop off |
|---|---|---|---|---|---|---|---|---|
| No. 1-a |  |  | 12 | 23 | 88:12 | −0.2 | 5 min | None |
| 1-b | None | 70 | 24 | 11 | 75:25 | −0.1 | Not less than 30 min | None |
| 1-c |  |  | 48 | 9 | 70:30 | +0.1 | Not less than 30 min | None |
| No. 2-a |  |  | 12 | 48 | 93:7 | −0.1 | Not more than 3 min | None |
| 2-b | None | 40 | 24 | 28 | 89:11 | −0.1 | 5 min | None |
| 2-c |  |  | 48 | 23 | 87:13 | +0.1 | 5 min | None |
| No. 3-a |  |  | 12 | 12 | 72:28 | +0.2 | Not less than 30 min | None |
| 3-b | Adjustment was done | 70 | 24 | 9 | 65:35 | −0.1 | Not less than 30 min | None |
| 3-c |  |  | 48 | 7 | 57:43 | −0.1 | Not less than 30 min | Dropped off |
| No. 4-a |  |  | 12 | 26 | 87:13 | −0.1 | 5 min | None |
| 4-b | Adjustment was done | 40 | 24 | 9 | 71:29 | +0.1 | Not less than 30 min | None |
| 4-c |  |  | 48 | 7 | 54:46 | −0.1 | Not less than 30 min | Dropped off |

Whether or not the curing reaction proceeded was observed by measuring the residual NCO amount by Fourier Transform Infrared Spectrometer "JIR-40" manufactured by Nihon Denshi K.K. The values were relative values where the value which was measured immediately after coating was assumed to be 100.

$^1$H-NMR was measured using an FX-90Q apparatus manufactured by Nihon Denshi K.K.

Chroma S/N is the S/N of a color signal in a video tape and was measured using a "NV-8200" VTR manufactured by Matsushita Electric Industries K.K. and is represented by the relative value of each sample based on the chroma S/N of Smaple NO. 1 which is 0 dB. The surface smoothness is constant where the value is within 0.1 dB.

The time where still image disappear was measured to evaluate still life where sample tapes were mounted on a VHS cassette half and reproduced on a VTR "NV-8200" manufactured by Matsushita Electric Industries K.K. Where the time is not less than 30 minutes, this means that the tape has sufficient wear resistance.

The degree of particle drop off from the magnetic layer (hereinafter "particle drop off") was evaluated where the tapes were slit, because as the ratio of forming (urea bond+biuret bond) increases, the magnetic recording layer is more cured and more brittle, and the magnetic recording layer is scraped away from the edge of the tape by the repeated use to cause drop-out.

It is clear from the above results that:
(1) Excellent wear resistance is shown in the still life test where the molar ratio of (urethane bond"allophanate bond):(urea bond+biuret bond) is 85:15 to 50:50.
(2) Particles are readily scraped away from the edge of the tape in slitting where the ratio of (urea bond+biuret bond) to (urethane bond+allophanate bnd) is more than 40:60.

From (1) and (2) above, it is preferred for the molar ratio of (urethane bond+allophanate bond):(urea bond+biuret bond) to be 85:15 to 60:40.
(3) The residual NCO amount of the sample having excellent wear resistance is not more than about 10% based on the NCO amount which was measured immediately after coating.
(4) As is seen from Sample No. 1-a, chroma S/N decreased where the tape was stored at 70° C. without adjusting for humidity.

While the invention has been described in detail and with reference to specific embodiments thereof, it will be apparent to one skilled in the art that various changes and modifications can be made therein without departing from the spirit and scope thereof.

What is claimed is:

1. A wear resistant magnetic recording medium comprising a non-magnetic support having coated thereon a magnetic recording layer comprising ferromagnetic particles dispersed in a binder, the binder containing polyisocyanate and polyurethane and the molar ratio of (urethane bond+allophanate bond):(urea bond+biuret bond) being 85:15 to 60:40, wherein the main component of the binder is a vinyl chloride copolymer, nitrocellulose or a mixture thereof.

2. The magnetic recording medium of claim 1, wherein said molar ratio of (urethane bond+allophane bond):(urea bond+biuret bond) is 80:20 to 70:30.

3. The magnetic recording medium of claim 1, wherein the residual isocyanate content is not more than about 10%.

4. The magnetic recording medium of claim 1, wherein said binder comprises 15 to 60% by weight of said vinyl chloride copolymer, nitrocelluose or a mixture thereof, 20 to 60% by weight of a polyurethane and 5 to 90% by weight of a polyisocyante based on the total weight of the binder.

5. The magnetic recording medium of claim 1, wherein said binder comprises 20 to 60% by weight of said vinyl chloride copolymer, nitrocelluose or a mixture thereof, 20 to 60% by weight of a polyurethane and 10 to 60% by weight of a polyisocyanate based on the total weight of the binder.

6. The magnetic recording medium of claim 1, wherein the main binder component is a vinyl chloride copolymer.

7. The magnetic recording medium of claim 1, wherein the main binder component is nitrocellulose.

8. The magnetic recording medium of claim 1, wherein the main binder component is a mixture of a vinyl chloride copolymer and nitrocellulose.

* * * * *